June 4, 1968  I. E. FAIR  3,387,235
SIGNAL DISPERSION SYSTEM
Filed June 11, 1964
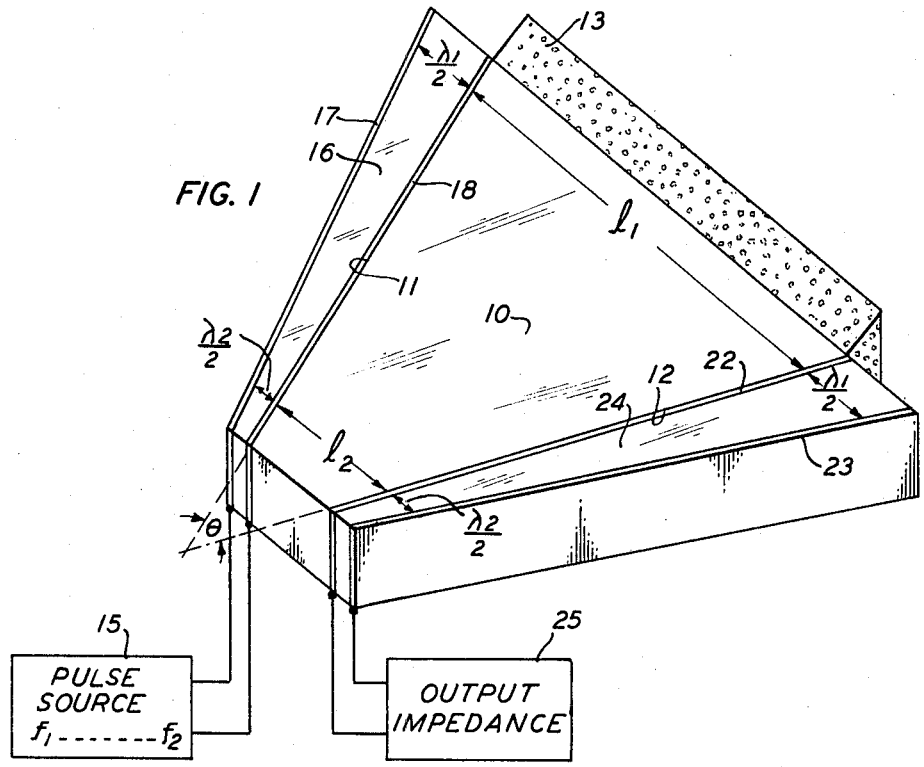
FIG. 1
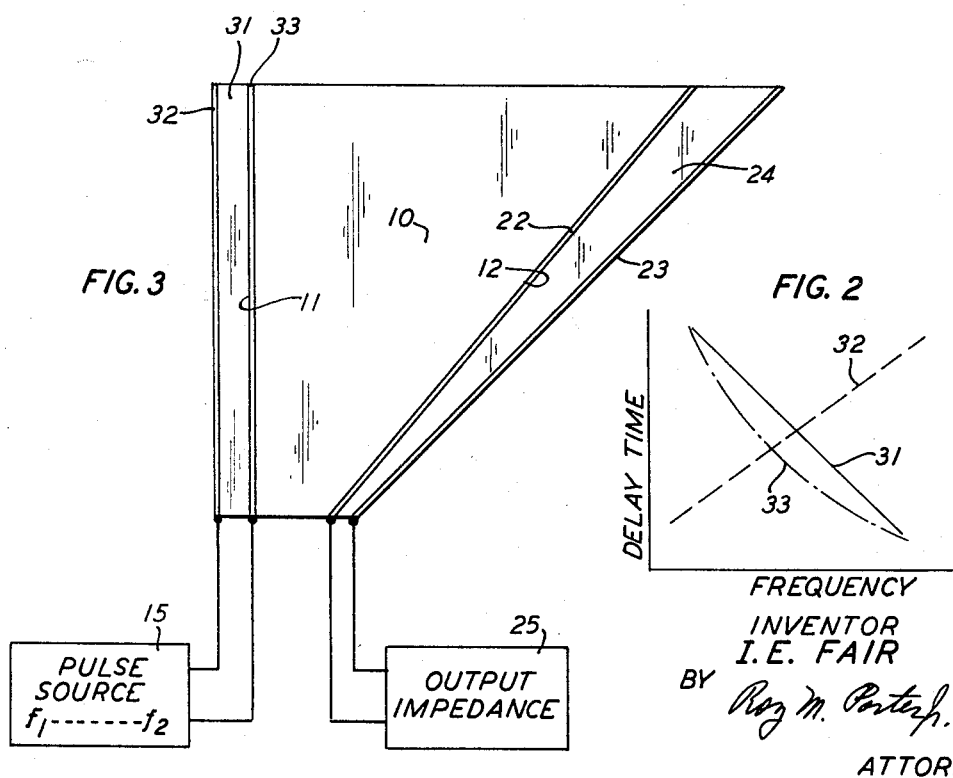
FIG. 3
FIG. 2
INVENTOR
I. E. FAIR
BY Roy M. Porter Jr.
ATTORNEY

United States Patent Office 3,387,235
Patented June 4, 1968

3,387,235
SIGNAL DISPERSION SYSTEM
Irvin E. Fair, Center Valley, Pa., assignor to Bell Telephone Laboratories, Incorporated, New York, N.Y., a corporation of New York
Filed June 11, 1964, Ser. No. 374,542
4 Claims. (Cl. 333—30)

This invention relates to frequency selective system for ultrasonic wave energy, and more particularly, to simple ultrasonic delay line structures having special delay versus frequency characteristics.

Ultrasonic dispersive delay lines, that is, those having a delay that varies according to some function with frequency, are well known and their usefulness in numerous applications is recognized. There is a need for both a delay versus frequency characteristic that increases as well as one that decreases with increasing frequency according to either a linear or nonlinear function. For example, in certain signal transmission systems an intelligence signal is first dispersed according to a given relationship that varies with frequency, and after certain operations are performed by or upon this signal, it must be returned to its original time relationship or collapsed. This dispersecollapse operation requires pairs of dispersive lines having "image" delay characteristics such that over the operating frequency band the sum of the delay of the two lines is constant.

One way in which suitable delay characteristics are presently obtained takes advantage of the fact that for certain modes of propagation in certin forms of delay lines, different frequencies inherently have different propagation velocities and therefore experience different delays as the multifrequency signal propagates along the line. However, little control can be had of the particular function according to which dispersion is thus produced. Furthermore, excessive lengths of these lines are required to produce large dispersions with an accompanying excessive loss.

It is therefore an object of the invention to efficiently produce a large dispersive delay of ultrasonic signals that varies according to any desired function with frequency.

Rather than attempt to utilize different propagation velocities for different frequencies as is done in the abovementioned prior art, the present invention provides different path lengths for different frequencies. In particular, a pair of piezoelectric transducers each having the piezoelectric element thereof tapered in its thickness dimension are located in nonparallel relationship on opposite sides of a wedge-shaped body of ultrasonic propagation material so that the distance between points of equal thickness between transducers varies according to the desired variation of delay as a function of frequency. Each transducer is provided with electrodes which couple with the piezoelectric potential over the whole face of the piezoelectric element. Because of its thickness taper each transducer is resonant at an infinite number of frequencies but responds to a given frequency only at that point on its face for which the thickness produces a resonant condition for that frequency. Therefore, the input transducer radiates a localized beam at each successive component frequency from a different point along its face and the output transducer similarly responds to each frequency at a different point along its face. Thus, energy at each frequency travels the unique distance between these points and is delayed by a unique amount.

These and other objects and features, the nature of the present invention and its various advantages, will appear more fully upon consideration of the specific illustrative embodiments shown in the accompanying drawings and described in detail in the following explanation of these drawings in which:

FIG. 1 is a perspective view of an illustrative embodiment of a dispersive delay line in accordance with the invention;

FIG. 2 is a typical delay versus frequency characteristic to be expected of a delay device in accordance with FIG. 1; and FIG. 3 represents a modification of the embodiment of FIG. 1.

Referring more particularly to FIG. 1, an illustrative embodiment of the invention is shown comprising a flattened, basically wedge-shaped block 10 of any suitable ultrasonic propagation material. For example, block 10 may be formed of an isotropic material such as glass or vitreous silica or a metal alloy of grain size small compared to the wavelength of the elastic wave to be carried. Block 10 has top and bottom plane surfaces that are substantially parallel and are spaced apart by a distance, referred to hereinafter as the transverse dimension of block 10, of at least ten wavelengths of the elastic wave energy so that these surfaces do not materially interfere with propagation of the desired mode. Block 10 further has left and right-hand edges or faces 11 and 12, respectively, that are oblique to each other so that extensions of these faces intersect at an acute angle $\theta$. Faces 11 and 12 have longitudinal dimensions in directions normal to the transverse dimension of block 10 each of which may be between several hundred and several thousand ultrasonic wavelengths. The remaining front and rear faces of block 10 are not critical to the invention, and truncation of the "wedge" to form the front face simplifies packaging. Preferably at least the larger, rear surface is provided with an acoustical wave absorber 13 of known type which absorbs and dissipates without reflection any acoustical energy reaching it.

Means are provided upon the lefthand face 11 of block 10 for launching a broadband or multifrequency wave of ultrasonic wave energy propagating with a broad wavefront within block 10. This energy is distributed on the basis of frequency along the length of face 11 with energy at the lowest frequency in the band being predominantly concentrated at one end of face 11 and energy at the highest frequency being concentrated at the other end of face 11. As illustrated, this means comprises a source 15 of electrical pulses having multifrequency components including at least the band of frequencies $f_1 \ldots f_2$ applied to an ultrasonic transducer which in turn comprises a thin piezoelectric crystal or ceramic member 16 together with its conductive electrodes 17 and 18. This transducer is similar to those conventionally employed except that member 16 is tapered in its thickness dimension along the length of face 11 from a maximum thickness adjacent to the widest part of block 10 of substantially one-half wavelength at the frequency of $f_1$ or $$\frac{\lambda_1}{2}$$

to a minimum thickness $$\frac{\lambda_2}{2}$$

or one-half wavelength at the frequency $f_2$. This transducer has surface dimensions comparable to the area of face 11 to which it is suitably bonded and is poled to produce the desired mode of ultrasonic vibration. According to a preferred embodiment the poling of member 16 is such as to produce vibration in the mode familiar to the art and conventionally designated the thickness shear mode which has a particle displacement perpendicular to the top and bottom surfaces of block 10. Vibrations in other modes could be employed but would present mode conversion difficulties not encountered with the preferred mode. The output transducer located upon face 12 is identical to the input transducer and comprises conductive electrodes 22 and 23 with an interposed tapered member 24 of crystalline or ceramic piezoelectric material poled so that it responds to the same mode of vibration produced by transducer 16–17–18. The electric field so produced is detected by electrodes 22 and 23 and delivered to an appropriate output load impedance or utilizing device 25.

The frequency responsive character of tapered piezoelectric transducers was first disclosed by the present applicant in his prior Patent 2,308,360, granted January 12, 1943 and was used in devices disclosed by G. W. Willard in patent 2,779,191, granted January 29, 1957. The Willard patent further includes a mathematical analysis of the phenomena which need not be repeated here.

For the purposes of the present invention it is sufficient to understand that when a voltage having a given frequency is impressed between electrodes 17 and 18, the piezoelectric element 16 will radiate ultrasonic energy into body 10 from that location on the wedge where element 16 is excited at resonance. Generally, this corresponds to the location at which the ultrasonic wavelength within the material of element 16 is twice the thickness. Even though excited electrically over its whole face, the element will be excited increasingly off resonance at locations removed from the resonant location and will hence radiate decreasing intensities of ultrasonic energy into body 10. If a multifrequency signal, as opposed to a single given frequency, is applied between electrodes 17 and 18, the radiated wavefront may be thought of as many localized beams, each at one of the component frequencies of the multifrequency signal, radiated with cylindrical wavefronts from each resonant point on the transducer face. Having cylindrical wavefronts these beams immediately diverge and overlap each other as the wave progresses into block 10. Therefore the frequency selectively of output transducer 22–23–24 aids in reseparating the component frequencies. While each point on the face of piezoelectric element 24 of the output transducer will be excited by wave components at many frequencies, any given point will respond most efficiently only to that frequency for which the element is resonant.

Thus, the lower frequency $f_1$ in the band will travel the distance $e_1$ from its point of excitation to its point of reception; the high frequency $f_2$ will travel the distance $e_2$; and each intermediate frequency will travel intermediate distances as schematically shown on FIG. 1. Energy at each frequency will be precisely delayed from the initiating time by the ultrasonic travel time along these distances. It should therefore be apparent that the maximum spacing between faces 11 and 12 determines the maximum delay at one end of the band, the minimum spacing therebetween determines the minimum delay at the other end of the band, and the acute angle $\theta$ determines the ratio between the two.

Inasmuch as the different delay times for the different frequency components is actually the result of different travel lengths rather than merely different travel times along the same path, a given degree of dispersion can be produced in a very much smaller structure, with much smaller average path length, than in the prior art dispersive delay lines. Since acoustic losses are a function of path length the present structure is more efficient than prior art lines.

Since the frequency bandwidth is determined by the maximum and minimum thicknesses of the transducers, it is possible to obtain much wider bandwidths than is possible with prior art lines.

FIG. 2 illustrates a typical delay versus frequency characteristic with curve 31 thereof representing a characteristic for the embodiment as illustrated in FIG. 1 with maximum delay at the lowest frequency and a linear transition to the higher frequency. Reversing the tapers of elements 16 and 17 with respect to the taper of body 10 will produce the reciprocal delay characteristic represented by curve 32. It should be understood that the linear relationship produced by straight faces 11 and 12 is merely illustrative and that one or both of these faces may be curved in either a concave or a convex manner according to any geometrical, exponential, logarithmic or other progression to produce any other desired dispersive variation such as the one represented by curve 33.

While the embodiment having wedge-shaped cross sections for both input and output transducers is preferred because of the increased discrimination obtained by their combined frequency selectivity, the basic principles of the present invention may be practiced with only a single wedge-shaped transducer. Such a modification is illustrated in FIG. 3 in which reference numerals corresponding to those of FIG. 1 have been used to designate corresponding components. Modification will be seen to reside in the fact that the input transducer includes a flat piezoelectric element 31 having parallel faces and parallel electrodes 32 and 33, while the output transducer remains wedge-shaped as in FIG. 1. In operation, electrical energy from source 15 will be converted by transducer 31–32–33 into multifrequency ultrasonic vibrations having a plane wavefront extending substantially the full length of face 11. As this wavefront passes obliquely into piezoelectric element 24, the strain which the wave sets up causes a predominant electric field to form between electrodes 22 and 23 only at that frequency for which the thickness produces resonance as in FIG. 1. Thus, as the wavefront sweeps initially across the lower, thin cross section of member 24, a response is produced at the higher frequencies in the applied band. As time passes the lower frequency component sweep further along member 24 until they reach their particular point of resonance and are reproduced at a time precisely delayed from the initiating time by the distance from face 11 to that resonant point. The electrical output detected by the electrodes 22 and 23 is representative of the sum of the separate frequency responses.

Like the embodiment of FIG. 1, the structure of FIG. 3 is reciprocal and a multifrequency wave applied between electrodes 22 and 23 will be converted into an ultrasonic wave having its energy distributed on the basis of frequency along face 12. Since piezoelectric member 31 responds at any given frequency only to energy arriving normal to its face, each frequency component of the ultrasonic wave travels a unique distance from its point of generation to transducer 31–32–33 along a path normal to the transducer face.

While the most important use of the present invention presently appears to be that of modifying the delay time versus frequency arrangement of components in a broadband signal, it should be understood that the principles of the invention include operation at a single frequency whereby the amplitude of signal delay may be varied by varying its frequency.

Aspects somewhat related to those of the present invention are described and claimed in the copending application of M. R. Parker, Serial No. 374,544, filed on an even date herewith.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

I claim:
1. A signal dispersion system comprising an ultrasonic propagation medium, means for launching ultrasonic energy including a multiplicity of frequencies upon said medium which together forms a broad wavefront propagating therein as a predominant wave in a given direction, and untrasonic transducer means located in said given direction away from said launching means, said transducer having a pair of opposing faces extending across the path of said wavefront for acoustically responding to different frequencies in said energy at different points along said faces and for producing an electrical output representative of the sum of said separate responses, both of said transducer faces extending across said wavefront at an acute angle to said given direction such that said different frequency responses occur at different distances from said means for launching.

2. The system as defined in claim 1 wherein said transducer means includes a member of piezoelectric material which is tapered in thickness through dimensions which are successively resonant at different ones of said multiplicity of frequencies.

3. The system as defined in claim 2 wherein said means for launching comprises a transducer means including a member of piezoelectric material which is tapered in thickness through dimensions which are successively resonant at different ones of said multiplicity of frequencies.

4. A signal dispersion system according to claim 1 wherein said means for launching comprises a transducer means upon one face of said medium for converting a multifrequency electrical signal into ultrasonic wave energy having components of different frequency distributed at points on the basis of frequency along the length of said face.

References Cited

UNITED STATES PATENTS

| | | | |
|---|---|---|---|
| 2,779,191 | 1/1957 | Willard | 73—67.8 |
| 2,965,851 | 12/1960 | May | 333—30 |
| 3,146,412 | 8/1964 | Wright | 33—30 |
| 3,148,343 | 9/1964 | Lockhart | 33—30 |
| 3,283,264 | 11/1966 | Papadakis | 333—6 |
| 3,300,739 | 1/1967 | Mortley | 333—72 |

FOREIGN PATENTS

| | | |
|---|---|---|
| 988,102 | 8/1962 | Great Britain. |
| 946,708 | 1/1964 | Great Britain. |

HERMAN KARL SAALBACH, *Primary Examiner.*

BENJAMIN A. BORCHELT, *Examiner.*

P. A. SHANLEY, C. BARAFF, *Assistant Examiners.*